May 15, 1923.
C. F. REILLEY ET AL
HUB CAP ATTACHMENT
Filed June 24, 1921
1,455,306
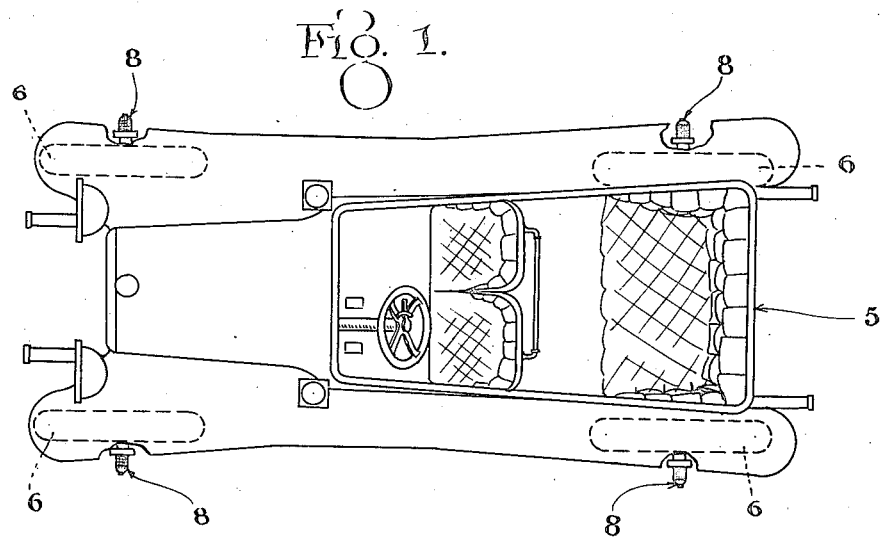
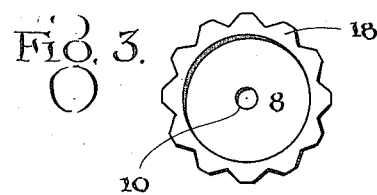
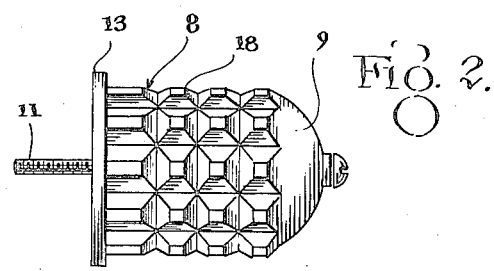
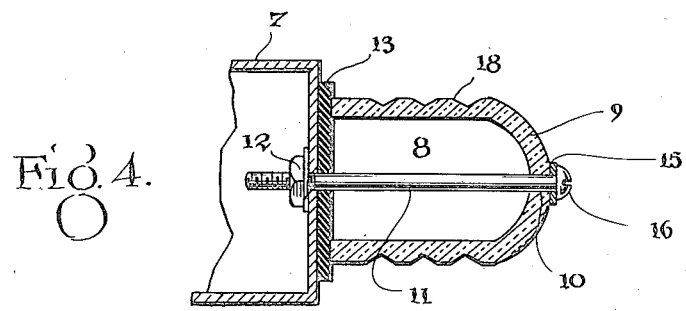
WITNESSES
CHARLES F. REILLEY.
JOSEPH J. LUDWIG
INVENTORS
BY
ATTORNEYS Patented May 15, 1923.

1,455,306

UNITED STATES PATENT OFFICE.

CHARLES FRANCIS REILLEY AND JOSEPH JAMES LUDWIG, OF WOONSOCKET, RHODE ISLAND.

HUB-CAP ATTACHMENT.

Application filed June 24, 1921. Serial No. 480,254.

*To all whom it may concern:*

Be it known that we, CHARLES FRANCIS REILLEY and JOSEPH JAMES LUDWIG, citizens of the United States, and residents of Woonsocket, in the county of Providence and State of Rhode Island, have invented certain new and useful Improvements in Hub-Cap Attachments, of which the following is a specification.

This invention relates to hub cap attachments for motor vehicles.

Briefly stated, an important object of this invention is to provide a hub cap attachment for motor vehicles having reflecting means which reflect the light rays from an approaching vehicle so that the operator of the approaching vehicle is enabled to safely clear the vehicle equipped with the attachment upon passing the same.

In carrying out the invention, one reflector may be attached to each of the four hub caps and those reflectors on the right side of the vehicle may be red, while those on the left side may be green.

A further object is to provide an attachment of the class described which may be readily and conveniently applied to a motor vehicle without marring the appearance of the vehicle or without altering the construction of the same in any substantial respects.

Other objects and advantages of the invention will be apparent during the course of the following description.

In the accompanying drawing forming a part of this application, and in which like numerals are employed to designate like parts throughout the same, Figure 1 is a plan view of a motor vehicle equipped with the improved reflector, one reflector being applied to each hub, Figure 2 is a side elevation of the reflector detached, Figure 3 is an end elevation of the reflector, Figure 4 is a longitudinal sectional view through the reflector applied.

In the drawings, the numeral 5 generally designates a motor vehicle having wheels 6 provided with hub caps 7 of any desired type.

The invention forming the subject matter of this application resides in a cylindrical reflector 8 adapted to be applied to the outer end of the hub cap so as to project a slight distance beyond the same and thereby serve as a gauge to enable the operators of passing vehicles to safely clear the vehicle equipped with the reflectors. As illustrated in Figure 4, the reflector 8 is of tubular formation and has its outer end closed and rounded as indicated at 9, the said rounded end being provided with a centrally arranged opening 10 through which a fastening bolt 11 is passed. The fastening bolt 11 is in turn adapted to be extended through a centrally arranged opening in the outer end of the hub cap and engaged by a nut 12 whereby to hold the body 8 in position. Hub caps sometimes have their outer ends of irregular formation and for this reason we have arranged a combined cushioning member and equalizer 13 between the body 8 and the hub cap. The member 13 which is in the nature of a washer is formed of rubber or other resilient material and not only prevents the cracking of the reflector upon the tightening of the bolt, but acts to exclude the dirt from the interior of the reflector. It is thus apparent that the resilient member 13 performs a triple function. In attaching the reflector to a hub cap, a soft washer 15 of copper or similar material, may be arranged between the head 16 of the bolt and the rounded outer end of the body 8.

The body 8 which is of glass is suitably colored on its inner side and is provided with a reflecting surface which reflects the rays of the lights of an approaching vehicle to warn the operator of the approaching vehicle as to the position of the vehicle equipped with the attachment. The body 8 is rendered highly conspicuous by reason of the fact that it rotates with the wheels and also by reason of an annular series of projections 18 formed on the surface of the body. The reflectors are not only visible from the front and rear of the vehicle but from the sides of the vehicle and effectively reflect the light from motor vehicles approaching from the side. In this case the light is reflected by the rounded outer ends 9 of the reflector.

We claim:

1. The combination with a vehicle having wheels provided with hubs, of cylindrical bodies extending horizontally from said hubs and having their peripheries formed with facets to reflect the light of vehicles approaching from either direction whereby the lateral extent of the vehicle is indicated, each of said cylindrical bodies being positively rotated with the associated hub whereby the facets are successively presented to the light.

2. The combination with a vehicle having wheels provided with hubs, of cylindrical bodies extending horizontally from said hubs and having their peripheries formed with facets to reflect the light of vehicles approaching from either direction whereby the lateral extent of the vehicle is indicated, each of said cylindrical bodies being positively rotated with the associated hub whereby the facets are successively presented to the light, and fastening bolts passing centrally through the cylindrical bodies for rigidly securing said bodies to the ends of the hubs.

3. The combination with a vehicle having front and rear wheels provided with hubs, of cylindrical bodies extending horizontally from said hubs and having their peripheries formed with facets to reflect the lights of approaching vehicles, whereby the lateral extent and the position of the vehicle may be indicated, and fastening bolts passing centrally through said cylindrical body for securing said body to the ends of the hub, and a cushioning member between each cylindrical body and the hub whereby to protect the cylindrical bodies.

CHARLES FRANCIS REILLEY.
JOSEPH JAMES LUDWIG.